US009816602B2

(12) United States Patent
Beisel et al.

(10) Patent No.: US 9,816,602 B2
(45) Date of Patent: Nov. 14, 2017

(54) LUBRICATION PINION MODULE, LUBRICATION PINION, AND METHOD FOR MANUFACTURING A LUBRICATION PINION MODULE

(71) Applicants: Daniel Beisel, Kronau (DE); Juergen Kreutzkaemper, Waibstadt-Daisbach (DE); Andreas Schoenfeld, Sankt Leon-Rot (DE)

(72) Inventors: Daniel Beisel, Kronau (DE); Juergen Kreutzkaemper, Waibstadt-Daisbach (DE); Andreas Schoenfeld, Sankt Leon-Rot (DE)

(73) Assignee: SKF Lubrication Systems Germany GmbH, Walldorf (DE)

( * ) Notice: Subject to any disclaimer, the term of this patent is extended or adjusted under 35 U.S.C. 154(b) by 141 days.

(21) Appl. No.: 14/721,577

(22) Filed: May 26, 2015

(65) Prior Publication Data

US 2015/0345615 A1 Dec. 3, 2015

(30) Foreign Application Priority Data

May 28, 2014 (DE) ........................ 10 2014 210 246

(51) Int. Cl.
*F16H 57/04* (2010.01)
*B22D 19/00* (2006.01)
(Continued)

(52) U.S. Cl.
CPC ..... *F16H 57/0471* (2013.01); *B22D 19/0036* (2013.01); *B23P 11/025* (2013.01);
(Continued)

(58) Field of Classification Search
CPC .. F16H 57/0431; F16H 55/06; F16H 57/0495; Y10T 74/19995; Y10T 74/19991
(Continued)

(56) References Cited

U.S. PATENT DOCUMENTS 1,502,083 A * 7/1924 Zoelly ................. F16H 57/0431
  184/15.1
2,309,908 A * 2/1943 Kinnucan ............. F16H 1/2854
  184/6.12
(Continued)

FOREIGN PATENT DOCUMENTS

DE 1876315 U 7/1963
DE 19511765 A1 10/1996
(Continued)

*Primary Examiner* — Henry Liu
(74) *Attorney, Agent, or Firm* — Bryan Peckjian; SKF USA Inc. Patent Dept.

(57) ABSTRACT

A lubrication pinion module for applying a lubricant onto a to-be-lubricated element includes a gear element having an inner surface mounted on an outer surface of a bearing element, the bearing element being mountable for rotation on a shaft and having at least one recess on its outer surface, and the gear element including a plurality of radially outwardly facing gear teeth, each of the plurality of gear teeth having first and second flanks, and at least one projection on the gear element inner surface extending into the at least one recess of the bearing element outer surface to form an interference fit with the bearing element such that the gear element rotates conjointly with the bearing element.

4 Claims, 2 Drawing Sheets

(51) Int. Cl.
*B23P 11/02* (2006.01)
*F16H 55/06* (2006.01)
*F16H 55/17* (2006.01)

(52) U.S. Cl.
CPC ............. *F16H 55/06* (2013.01); *F16H 55/17* (2013.01); *F16H 57/0431* (2013.01); *F16H 57/0493* (2013.01); *F16H 2055/065* (2013.01); *Y10T 29/49867* (2015.01); *Y10T 74/19991* (2015.01); *Y10T 74/19995* (2015.01)

(58) Field of Classification Search
USPC .......................................... 184/6.12; 74/409
See application file for complete search history.

(56) References Cited

U.S. PATENT DOCUMENTS

| | | | | | |
|---|---|---|---|---|---|
| 2,327,962 | A | * | 8/1943 | Drake | F16N 7/40 184/6.12 |
| 2,861,477 | A | * | 11/1958 | Mueller | F16H 48/08 184/6.12 |
| 3,040,600 | A | * | 6/1962 | Mueller | F16H 48/08 184/6.12 |
| 3,065,822 | A | * | 11/1962 | Mcafee | B60R 17/00 184/11.1 |
| 3,361,003 | A | * | 1/1968 | Hodgson | F16H 1/16 74/424.6 |
| 3,424,022 | A | * | 1/1969 | Greenberg | F16H 57/0431 74/409 |
| 3,454,136 | A | * | 7/1969 | Stark | F16H 25/24 184/6 |
| 3,516,298 | A | * | 6/1970 | Arndt | F16H 1/16 74/409 |
| 3,822,607 | A | * | 7/1974 | Tharaldsen | F16H 57/0431 184/6.12 |
| 4,068,740 | A | * | 1/1978 | Quinn | F01M 9/10 184/11.1 |
| 4,098,137 | A | * | 7/1978 | Yaros | B21D 53/261 29/892.1 |
| 4,957,187 | A | * | 9/1990 | Burgess | B01D 19/0052 184/6.12 |
| 5,242,033 | A | * | 9/1993 | Toraason | F16H 57/0412 184/6.12 |
| 5,494,135 | A | * | 2/1996 | Brackett | F01B 9/023 123/197.4 |
| 5,622,239 | A | * | 4/1997 | Orlitzky | F16H 57/0463 184/39 |
| 5,695,424 | A | * | 12/1997 | Mizuta | F16C 33/10 184/6.12 |
| 5,889,102 | A | * | 3/1999 | Haack | C08K 5/0008 524/310 |
| 6,077,063 | A | * | 6/2000 | Santi | F16H 55/06 264/275 |
| 6,474,444 | B1 | * | 11/2002 | Mochizuki | F16C 19/386 184/6.12 |
| 6,591,708 | B2 | * | 7/2003 | Kobayashi | B29C 70/345 264/257 |
| 6,988,582 | B2 | * | 1/2006 | Kitami | B62D 5/0409 180/444 |
| 7,244,097 | B2 | * | 7/2007 | Hinz | F03D 7/0224 415/122.1 |
| 7,699,584 | B2 | * | 4/2010 | Mollhagen | F03D 80/70 184/4 |
| 7,814,809 | B2 | * | 10/2010 | Shinohara | F16H 55/06 74/409 |
| 8,047,332 | B2 | * | 11/2011 | Salmela | F16H 57/0431 184/13.1 |
| 8,171,815 | B2 | * | 5/2012 | Paluncic | F04C 2/084 74/467 |
| 8,196,489 | B2 | * | 6/2012 | Paluncic | F04C 2/084 74/468 |
| 8,256,318 | B2 | * | 9/2012 | Vassaux | F16H 57/0431 184/6.12 |
| 8,272,990 | B2 | * | 9/2012 | Hagedorn | F16C 33/102 475/331 |
| 8,298,109 | B2 | * | 10/2012 | Steele | F16H 57/04 184/6.12 |
| 8,387,754 | B2 | * | 3/2013 | Konig | F16D 23/04 184/6.12 |
| 8,595,934 | B2 | * | 12/2013 | Derse | F16H 55/14 188/378 |
| 8,659,180 | B2 | * | 2/2014 | Earl | E02B 9/08 290/54 |
| 8,978,501 | B2 | * | 3/2015 | Demtroder | B23P 11/025 29/893 |
| 9,162,379 | B2 | * | 10/2015 | Itani | B29C 43/027 |
| 9,205,611 | B2 | * | 12/2015 | Oolderink | B29C 37/0082 |
| 9,239,038 | B2 | * | 1/2016 | Earl | E02B 9/08 |
| 9,441,613 | B2 | * | 9/2016 | Orlitzky | F16N 11/08 |
| 2001/0034281 | A1 | * | 10/2001 | Redmond | F16H 7/20 474/197 |
| 2004/0166974 | A1 | * | 8/2004 | Hodjat | F16F 15/126 474/94 |
| 2007/0087617 | A1 | * | 4/2007 | Oberle | F16H 55/06 439/395 |
| 2007/0293365 | A1 | * | 12/2007 | Thoma | F16H 57/0431 475/331 |
| 2008/0146402 | A1 | * | 6/2008 | Shinohara | F16H 55/06 475/331 |
| 2010/0000358 | A1 | * | 1/2010 | Paluncic | F04C 2/084 74/468 |
| 2010/0101352 | A1 | * | 4/2010 | Paluncic | F04C 2/084 74/467 |
| 2010/0200335 | A1 | * | 8/2010 | Konig | F16D 23/04 184/6.12 |
| 2010/0201030 | A1 | * | 8/2010 | Oberle | F16H 55/06 264/262 |
| 2010/0322812 | A1 | * | 12/2010 | Geiman | B21K 1/30 419/6 |
| 2011/0113739 | A1 | * | 5/2011 | Scuffham | A01D 69/12 56/12.3 |
| 2011/0250070 | A1 | * | 10/2011 | Demtroder | B23P 11/025 416/170 R |
| 2012/0000307 | A1 | * | 1/2012 | Oolderink | B29C 37/0082 74/425 |
| 2013/0047767 | A1 | * | 2/2013 | Itani | B29C 43/027 74/439 |
| 2014/0076662 | A1 | * | 3/2014 | Newberry | B64C 27/14 184/6.12 |
| 2015/0233464 | A1 | * | 8/2015 | Wiens | F16C 33/6666 184/6.12 |

FOREIGN PATENT DOCUMENTS

| | | |
|---|---|---|
| DE | 10127224 A1 | 12/2002 |
| DE | 102006013865 A1 | 9/2007 |
| DE | 202007001440 U1 | 6/2008 |
| DE | 102010044757 A1 | 3/2012 |
| JP | H06341509 A | 12/1994 |
| JP | 2011153656 A1 | 8/2011 |
| WO | 2008113396 A1 | 9/2008 |

* cited by examiner

LUBRICATION PINION MODULE, LUBRICATION PINION, AND METHOD FOR MANUFACTURING A LUBRICATION PINION MODULE

CROSS-REFERENCE

This application claims priority to German patent application no. 10 2014 210 246.4 filed on May 28, 2014, the contents of which are fully incorporated herein by reference.

TECHNOLOGICAL FIELD

The present disclosure is directed to a lubrication pinion module for a lubrication device, for example, a device for applying a lubricant onto a to-be-lubricated element such as a gear wheel, the lubrication pinion module including a gear element and a bearing element. Also disclosed are a lubrication pinion having at least one lubrication pinion module and a method for manufacturing a lubrication pinion module.

BACKGROUND

Lubrication pinion modules are known from the prior art, for example from DE 102010044757 or DE 202007001440 U1, which include a gear region made from a foam material disposed on a bush. In such devices, lubricant is dispensed from the interior of the bush, or from a lubricant reservoir disposed between the bush and the gear element, to the gear element and is stored therein. Lubricant can thereby be uniformly dispensed from the gear element to a to-be-lubricated element, in particular to a gear wheel that meshes with the lubrication pinion module.

Disadvantageously, in prior art devices like this, lubricant is always present over the entire foam gear including at locations that require no lubrication. A further problem is that the fluidity (viscosity) of the lubricant typically changes with ambient- or operating-temperature. Thus, the lubricant can become very stiff (viscous) at temperatures below zero degrees Celsius, so that it can no longer be output (extruded) from the foam material at these low temperatures due to its stiffness (higher viscosity) and, consequently, the foam-material pinion hardens overall. On the other hand, at temperatures above zero degrees Celsius the lubricant can become too thin (too low a viscosity), so that too much lubricant is provided to the to-be-lubricated elements.

If the lubrication pinion module is not manufactured from foam material, then lubricant channels are usually provided in the lubrication pinion module, through which channels lubricant is pumped radially outward from the vicinity of the axis of the module. Such lubrication pinion modules are usually configured without a bush since they can rotate stably on a shaft by themselves. A particularly simple design of such a lubrication pinion module is depicted in WO 2008/113396 (U.S. Pat. No. 8,171,815), which discloses a lubrication pinion module comprised of two lubrication-pinion-module parts that are connectable to each other along a dividing plane, and at least one lubricant channel extends in the dividing plane. In this case, the lubricant channel is formed from two lubricant channels, and the lubricant-channel halves are formed at the corresponding dividing planes in the respective lubrication-pinion-module parts. If the two lubrication pinion modules are connected to each other, these lubricant channel halves can form the lubricant channels, and thus a particularly simple method of manufacturing the lubricant channels is provided. These lubrication pinion module parts are usually joined using support sleeves, screws, and washers, and the washers used in the outer lubrication pinion module parts are designed such that the pinion parts conically deform with the insertion of the washers. The lubrication pinion module is then brought back into a parallel initial shape by screwing together the pinion parts, thus achieving a sealing of the lubrication pinion module parts in the dividing plane.

One problem with known lubrication pinion modules is that sealing between two parts of such a module is very complex. This is because the to-be-sealed surfaces can be very large and because the support sleeves, washers, and screws which are required must be precisely matched to one another. However, this complex sealing arrangement is necessary since, if the sealing between the elements is inadequate, lubricant could penetrate into the dividing plane, and escape therefrom into the environment in an uncontrolled and unused manner.

A further problem with existing lubrication pinion modules is that they can only be used up to a certain rotational speed. At higher speeds, the high friction on the shaft supporting the lubrication pinion module or on the to-be-lubricated element could lead to a large temperature increase. With certain lubricants, this can lead to a degrading (excessive wear and tear) of the lubrication pinion module.

SUMMARY

It is therefore an object of the present disclosure to provide a lubrication pinion module that can reliably guide lubricant, over a wide temperature range, to a to-be-lubricated element, and which is also usable at high rotational speeds.

According to the disclosure, a lubrication pinion module, in particular one for a lubrication device for applying a lubricant onto a to-be-lubricated element like a gear wheel, is provided. The lubrication pinion module includes a gear element and a bearing element. The gear element is configured to supply the to-be-lubricated element with lubricant, and the bearing element is configured to support the lubrication pinion module on a preferably stationary (non-rotating) shaft. The present disclosure is based on the concept of connecting the bearing element and the gear element to each other for conjoint rotation, in particular in an interference-fit manner, so that the bearing element and the gear element rotate together in a fixed manner or fixed relationship. Since the bearing element and gear element are connected to each other for conjoint rotation, no or only an insignificant relative movement takes place between the gear element and bearing element, and thus the bearing element and gear element assume a defined position with respect to each other. This defined position produces a continuously formed lubricant channel extending from a lubricant supply inlet in the vicinity of an axle (shaft) up to a lubricant outlet in the vicinity of the gear element, and the defined position prevents a blocking position, i.e., a position wherein no lubricant can be pumped from the axle towards the gear element. Moreover, a lubrication pinion module can be provided by means of the inventive interference-fit connection between the bearing element and the gear element, which lubrication pinion module can be driven at a higher rotational speed while requiring no additional sealing elements in order to provide a seal, even over a large temperature range of the lubricant.

According to a further advantageous exemplary embodiment, the bearing element is molded into the gear element using a casting method, an injection method, or an injection molding method. A connection for conjoint rotation between the bearing element and the gear element can thereby be provided in a simple and quick manner.

Furthermore, because the gear element is molded to the bearing element during the manufacturing process of the gear element, a particularly good sealing between the bearing element and gear element can be provided. Thus on one hand the gear element is fixedly connected to the bearing element, and on the other hand a significantly higher system pressure (lubricant pressure) is exertable on the lubrication pinion module. Using this configuration, no further seal elements, such as, for example, seal rings, are needed to provide a sealing between the bearing element and the gear element.

Furthermore, the bearing element has at least one, preferably several, recesses, into which the material of the gear element is receivable for the formation of the interference-fit connection. The one or more recesses can be configured as one or more bores and/or as one or more encircling grooves. A recess configured as a bore has the advantage that it impedes relative rotation between the gear element and the bearing element. However, a recess configured as a groove makes possible a sealing between the bearing element and the gear element. In this case, it is particularly advantageous if, during the manufacture of the gear element from a fluid material, the at least one recess is filled in an interference-fit manner with the material used for the manufacture of the gear element.

According to a further advantageous exemplary embodiment, the gear element is configured one-piece (is unitary) and preferably includes at least one gear having a tooth head and two tooth flanks circumferentially bordering the tooth head. Furthermore, within the gear element at least one, preferably two, substantially radially extending lubricant channel(s) is (are) formed, which preferably include(s) a lubricant outlet formed in the tooth flank. This lubricant channel is preferably formed during the manufacture of the interference-fit connection, in particular during the casting-, injection, or injection-molding process. A molded lubricant channel is thereby formed without a post-processed boring (drilling) or an assembly process (i.e. assembly of two lubricant channel halves). This has the advantage that no further lubrication pinion module is necessary for sealing of the lubricant channel, since the lubricant channel from the beginning, in particular an inner diameter of the pinion, up to its end, in particular its outlet on the tooth flank, is intrinsically enclosed.

It is particularly preferably for the channel to have a round cross-section. Furthermore, the lubricant channel can have a conical shape in the direction towards the tooth head. This helps ensure that a placeholder (e.g., a rod or pin) used to form a lubricant channel can be easily separated from the gear element after the manufacturing process that forms the gear element, in particular after the casting-, injection-, or injection-molding process, in order to expose the lubricant channel(s).

Furthermore at least one lubricant channel ends at each tooth flank of the gear element. Providing each tooth flank with at least one lubricant channel helps ensure a particularly good and uniform lubricant distribution.

According to a further advantageous exemplary embodiment, the gear element is manufactured from a material that is processable in fluid form, and in particular from a plastic such as polyurethane, by using a casting method, an injection method, or an injection-molding method. Since the gear element is manufactured from a material that is processable in fluid form, the manufacturing process can be significantly simplified overall. In particular the lubricant channels can be formed directly during the manufacturing of the gear element and no longer need to be bored, as was common in the prior art, by a post-processing of the lubrication pinion module, or to be formed by a screwing-together of lubrication-pinion-module parts (halves). The lubricant channels can thereby be manufactured in a precise and simple manner.

According to a further advantageous exemplary embodiment, the bearing element is configured as a hollow-cylindrical bush and has an outer surface that connects with the gear element in an interference-fit manner so that at least one through-opening is formed in the outer surface. In this case, the through-opening is advantageously in fluid connection with the lubricant channel. Lubricant that is supplied via a stationary axle (shaft), which is received by (supports) the bush, can thereby be introduced towards (into) the lubricant channels. Since the bearing element is configured in an interference-fit manner with the gear element, the through-openings in the bush are always fluidly connected to the lubricant channel(s), so that lubricant can flow out through at least one lubricant channel in every position of the lubrication pinion module. Thus at no time can a blocking position result in which lubricant is not dischargeable from the axle (shaft) towards the lubricant channel.

In this case, it is advantageous in particular if the placeholders required for the formation of the lubricant channels are placed (inserted) between the bearing element and the gear element during the process of forming the interference-fit connection such that the placeholders are in alignment with the through-openings, whereby it can be ensured that the lubricant channels are directly in fluid connection with the through-openings.

According to a further advantageous exemplary embodiment, the bearing element is manufactured from a dimensionally stable and/or low-friction material, in particular from a plastic, preferably polyamide, or a metal, preferably aluminum. In this case, it is advantageous that the bearing element be prefabricated, since a prefabricated bearing element can be molded into the gear element particularly well.

According to a further aspect of the present disclosure a lubrication pinion is provided that includes at least one such lubrication pinion module. Due to this modular design it is possible to realize a lubrication pinion having axially different widths simply by changing the number of the lubrication pinion modules disposed on the axle (shaft). Warehousing costs can thus be advantageously reduced.

A further advantageous aspect of the present disclosure is directed to a method for manufacturing a lubrication pinion module, as described above, that includes a bearing element and a gear element connected to each other in an interference-fit manner, in particular by using a casting-, injection-, or injection-molding method. A lubrication pinion can thereby be provided that is fast and easy to manufacture, and that is designed for high rotational speeds. The molded lubricant channels also help provide a greater impermeability than machined lubricant channels. Further method steps were already disclosed in the above text or inevitably result from the corresponding description of the lubrication pinion module.

Further advantages and advantageous designs are defined (described) in the claims, the description, and the drawings.

BRIEF DESCRIPTION OF THE DRAWINGS

Embodiments of the disclosure will be described in more detail hereinafter with reference to an exemplary embodiment depicted in the drawings. The exemplary embodiment is of a purely exemplary nature and is not intended to define or limit the scope of protection of the present subject matter. The scope of protection is determined solely by the appended claims.

DETAILED DESCRIPTION

In the following, identical or functionally equivalent elements are designated by the same reference numbers.

Figure 1:
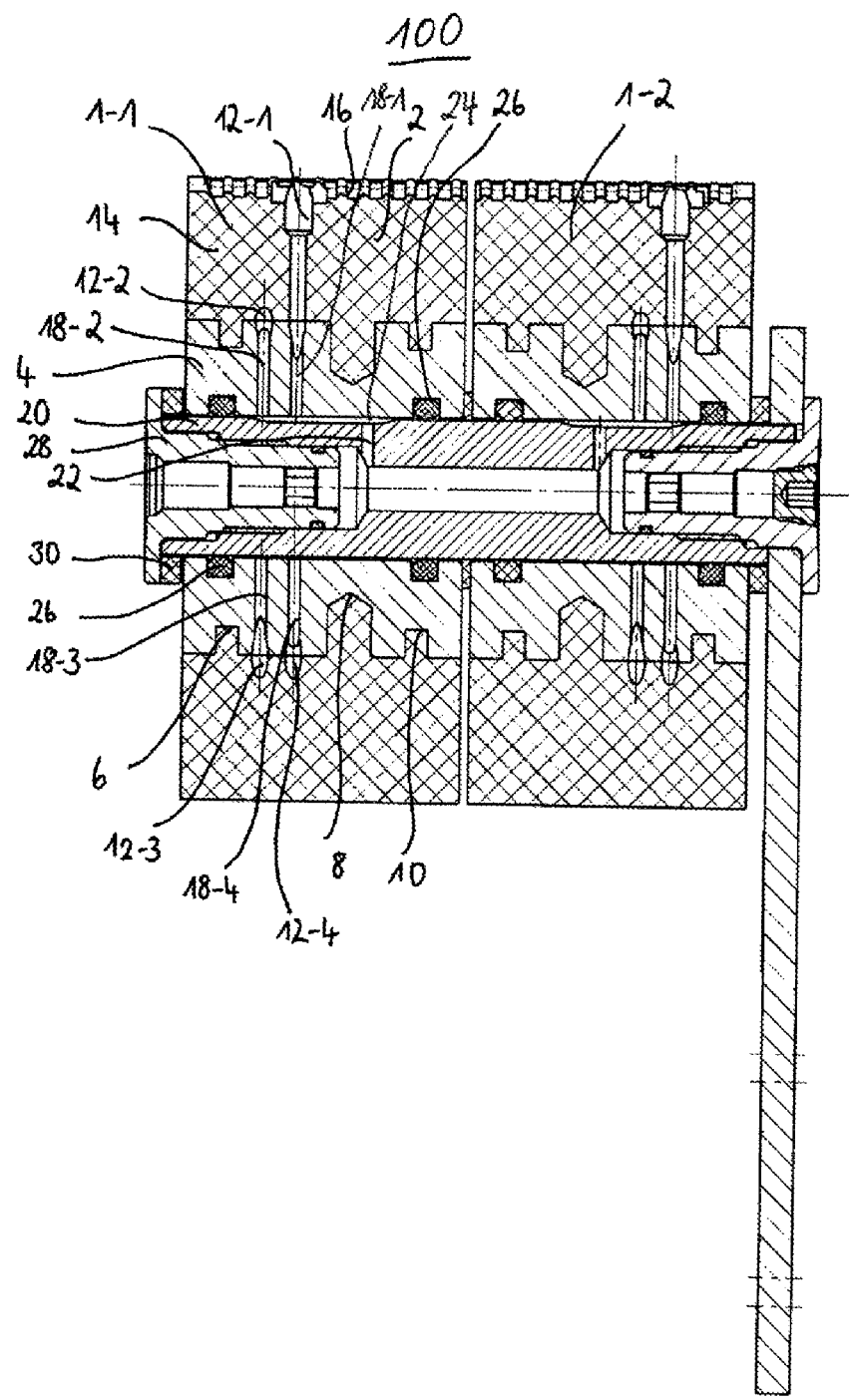
FIG. 1 is a schematic sectional view along the longitudinal axis of a preferred exemplary embodiment of a lubrication pinion of the present disclosure.

FIG. 1 schematically shows a sectional view along a longitudinal axis through a preferred exemplary embodiment of an inventive lubrication pinion 100 that comprises two lubrication pinion modules 1-1 and 1-2. Each lubrication pinion module 1 comprises a gear element 2 and a bearing element 4, and the bearing element 4 is embedded, in particular molded, in an interference-fit manner into the material of the gear element. For this purpose, recesses 6, 8, 10 are formed on the bearing element 4, and the material of the gear element penetrates into these recesses and produces an interference-fit connection. The recesses 6, 8, 10 can have different shapes and may comprise, as in the case of the recess 8, a bore disposed in a circumferentially distributed manner. This helps to substantially prevent relative movement between the gear element 2 and the bearing element 4. The recesses can also be configured as one or more at least partially circumferentially extending grooves 6, 10, which grooves provide additional sealing between the bearing element 4 and the gear element 2.

The gear element 4 may be manufactured from a foam material, such as a foam rubber or foamed polyurethane.

Furthermore, FIG. 1 shows that a plurality of lubricant channels 12-1, 12-2, 12-3, 12-4 are provided in the gear element 2, which channels are formed together with the body of the gear region 2 during the manufacturing process. These lubricant channels 12 extend substantially radially from an interior of the lubrication pinion module to a tooth flank 14 of the gear region 2, so that lubricant cannot exit directly to the tooth head 16, but rather can exit to the tooth flanks in a laterally offset manner. A particularly good lubricating is thereby provided (achieved).

Radially inner ends of the lubricant channels 12 are in fluid connection with through-openings 18-1, 18-2, 18-3, 18-4, which are formed (defined) in the bearing element 4. This fluid connection can be produced during the formation (manufacture) of the gear element 2 by inserting placeholder elements (not shown) such as rods or pins directly into the through-openings 18 of the bearing element 4 during the manufacturing process of the gear region. The gear element 2 is then formed or molded over the bearing element 4 and the placeholder elements, and when the placeholder elements are removed from the finished gear element 2, the lubricant channels 12 are left in the spaces previously occupied by the placeholder elements.

Figure 2:
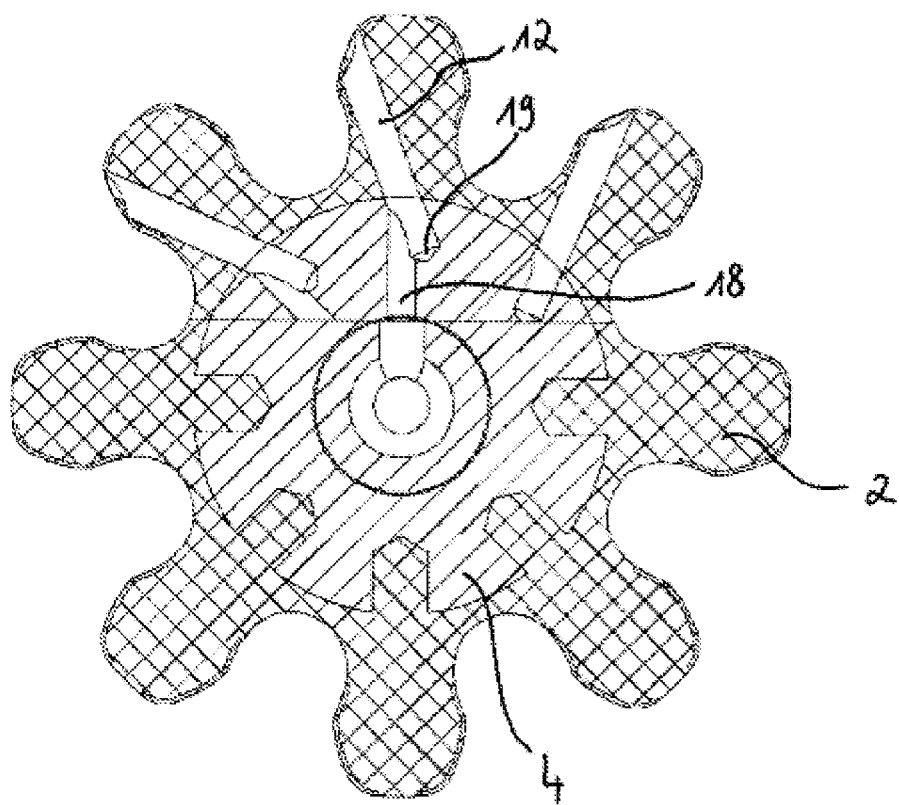
FIG. 2 is a schematic radial sectional view through the lubrication pinion module shown in FIG. 1.

This is clear in particular from the radial sectional view of FIG. 2 in which it can be clearly seen that the through-openings 18 are fluidly connected to the lubricant channels 12. Furthermore the bearing element may include extra locating pockets 19 to receive ends of the placeholder elements (not depicted), which locating pockets 19 ensure a particularly good and reliable locating of the placeholder elements.

Furthermore, FIG. 1 shows that an axle (shaft) 20 is receivable in (supports) the bearing element 4, and the lubricant is suppliable via the axle. The lubrication pinion 100 is rotatably supported on this axle 20, which is preferably stationary (non-rotating) during operation. For the sake of simplicity, the lubricant guidance will be discussed herein with reference to the lubricant module 1-1. However, the lubrication pinion module 1-2 is configured in an analogous manner and thus the lubricant is guided in the same manner in lubrication pinion module 1-2. In order to transport (fluidly communicate) lubricant from the axle 20 to the lubrication pinion module 1-1, the axle 20 further includes an opening 22, which opens into a recess 24, in particular a slot, from which the lubricant is transportable to the respective through-openings 18, i.e. the through-openings 18-1, 18-2, and the lubricant channels 12, i.e. the lubricant channels 12-1, 12-2.

In this case, the recess 24 is designed such that a gear, i.e., a tooth head having, as depicted herein, two lubricant channels, is always supplied with lubricant. It can thereby be ensured that lubricant is only dispensed into the respective lubricant channels that are directly in contact with the to-be-lubricated element. However, a plurality of recesses 24 can also be provided on the axle 20, in case a plurality of to-be-lubricated elements are to be simultaneously supplied with lubricant.

The axle 20 and the bearing element 4 are sealed via seal rings 26. Furthermore, FIG. 1 shows that an adapter 28, for example, for connecting to a lubricant line, can be held in the axle 20, which adapter 28 is supported on the bearing element 4 via slide washers 30. In this case, the axle 20 is configured to be stationary, and only the lubricating pinion 100 rotates about the axle 20, as was noted above. Furthermore, as will be recognized from FIG. 1, the lubrication pinion modules 1-1 and 1-2 can be supported so as to rotate independently from each other.

In addition to the two lubrication pinion modules 1-1, 1-2, additional lubrication pinion modules (not illustrated) can also be supported on the axle 20. This modular design makes it possible to form lubrication pinions having axially different widths simply by changing the number of lubrication pinion modules 1-1, 1-2 disposed on the axle (shaft) 20. Warehousing costs can thereby in turn be advantageously reduced. Depending on the application, the axle 20 can be provided with an appropriate number of openings 22 and recesses 24 in order to provide a corresponding number of lubrication pinion modules with lubricant.

Due to the new and inventive design of the lubrication pinion module, the critical seal surfaces in the lubrication pinion modules, which are usually comprised of two partial regions, are omitted. Moreover, due to the new channel guidance, a one-piece lubrication module can be utilized alone, since no counter-piece is needed for sealing the lubricant channel guide. In addition, due to the direct casting of the bearing element during the manufacturing process for forming the gear element, a sealing between the bearing element and the gear element is also provided, so that a further possible leakage point can also be eliminated because the material of the lubrication pinion module fixedly connects to that of the bearing element. It is thereby made possible that the new and inventive lubrication pinion module can withstand a significantly higher system pressure (lubricant pressure) than conventional lubrication pinions. Since the lubricant channels are no longer formed in an assembled manner, further attachment elements, such as washers, support sleeves, or screws, are also omitted, so that the manufacturing is simpler overall. Moreover, a plurality of lubrication pinion modules, rotating independently of one another, also can be disposed on a shaft. Moreover, since the lubricant channels in the bearing element and thus also the lubricant channels in the gear element can be matched to one another in connection with an outlet geometry on the axle, at no time is a so-called blocking position possible. It can thereby always be ensured that lubricant can flow out through at least one lubricant channel.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved lubrication pinion modules.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

100 Lubrication pinion
1-1, 1-2 Lubrication pinion module
2 Gear element
4 Bearing element
6, 8, 10 Recesses
12 Lubricant channel
14 Tooth flank
16 Tooth head
18 Through-bore in the bearing element
19 Locating pockets
20 Axle
22 Lubricant outlet bore
24 Recess, slot in axle
26 Seal ring
28 Adapter
30 Slide washer

We claim:

1. A lubrication pinion module for applying a lubricant onto a to-be-lubricated element, the lubrication pinion module comprising:
   a bearing element configured to be mounted for rotation on a shaft;
   a gear element comprising a plurality of radially outwardly facing gear teeth, each of the plurality of gear teeth having first and second flanks and the gear element having an inner surface mounted on the bearing element outer surface in an interference fit manner with the bearing element such that the gear element rotates conjointly with the bearing element,
   wherein a lubrication passage having a longitudinal axis extending at an acute angle to a radial direction extends from the first flank of each gear tooth, and
   wherein the bearing element includes a first lubrication passage portion coaxial with the lubrication passage of the gear element in fluid communication with the lubrication passage of the gear element and a second, radial, lubrication passage portion that intersects the first lubrication passage portion.

2. The lubrication pinion module according to claim 1, wherein the gear element is overmolded on the bearing element.

3. The lubrication pinion module according to claim 1, wherein the gear including the plurality of teeth is formed from foam rubber or foam plastic.

4. A lubrication pinion module for applying a lubricant onto a to-be-lubricated element, the lubrication pinion module comprising:
   a gear element including a plurality of teeth, the teeth being formed from foam rubber or foam plastic; and
   a bearing element,
   wherein the gear element is configured to supply the to-be-lubricated element with lubricant, and the bearing element is configured to support the lubrication pinion module on a shaft,
   wherein the bearing element and the gear element are connected to each other for conjoint rotation,
   wherein the bearing element includes at least one recess configured to provide an interference-fit connection with the gear element, and
   wherein the at least one recess of the bearing element is filled with the material used for the manufacture of the gear element,
   wherein a lubrication passage having a longitudinal axis extending at an acute angle to a radial direction extends from a first flank of each tooth of the plurality of gear teeth, and
   wherein the bearing element includes a first lubrication passage portion coaxial with the lubrication passage of the gear element and a second, radial, lubrication passage portion that intersects the first lubrication passage portion.

\* \* \* \* \*